(12) United States Patent
Kim et al.

(10) Patent No.: US 11,167,766 B2
(45) Date of Patent: Nov. 9, 2021

(54) STEERING CONTROL APPARATUS AND STEERING CONTROL METHOD AND, STEERING SYSTEM

(71) Applicant: MANDO CORPORATION, Pyeongtaek-si (KR)

(72) Inventors: Dae Sung Kim, Suwon-si (KR); SeungCheol Lee, Osan-si (KR); Jin Hwan Lee, Seongnam-si (KR)

(73) Assignee: Mando Corporation, Pyeongtaek-si (KR)

( * ) Notice: Subject to any disclaimer, the term of this patent is extended or adjusted under 35 U.S.C. 154(b) by 227 days.

(21) Appl. No.: 16/405,278

(22) Filed: May 7, 2019

(65) Prior Publication Data

US 2019/0344800 A1 Nov. 14, 2019

(30) Foreign Application Priority Data

May 8, 2018 (KR) .......................... 10-2018-0052662

(51) Int. Cl.
| | | |
|---|---|---|
| *B60W 50/035* | (2012.01) | |
| *B62D 6/00* | (2006.01) | |
| *B60W 50/04* | (2006.01) | |
| *G05B 23/02* | (2006.01) | |
| *G07C 5/08* | (2006.01) | |
| *B62D 5/04* | (2006.01) | |
| *B60W 50/02* | (2012.01) | |

(52) U.S. Cl.
CPC ...... *B60W 50/035* (2013.01); *B60W 50/0205* (2013.01); *B60W 50/04* (2013.01); *B62D 5/0481* (2013.01); *B62D 6/00* (2013.01); *G05B 23/0208* (2013.01); *G07C 5/0808* (2013.01)

(58) Field of Classification Search
CPC .......... B60W 50/035; B60W 50/0205; B60W 50/04; B62D 5/0481; B62D 6/00; G05B 23/0208; G07C 5/0808
USPC .......................... 701/29.1, 29.2, 32.7, 41, 43
See application file for complete search history.

(56) References Cited

U.S. PATENT DOCUMENTS

| | | | | |
|---|---|---|---|---|
| 2017/0253269 A1* | 9/2017 | Kanekawa | ............. | G05B 11/42 |
| 2018/0229761 A1* | 8/2018 | Fujita | ..................... | B62D 5/046 |

FOREIGN PATENT DOCUMENTS

| | | | |
|---|---|---|---|
| JP | 2004-345412 A | | 12/2004 |
| JP | 2004345412 A | * | 12/2004 |
| JP | 2005-104439 A | | 4/2005 |
| JP | 2010-184609 A | | 8/2010 |

(Continued)

OTHER PUBLICATIONS

Notice of Allowance issued in corresponding Korean Patent Application No. 10-2018-0052662 dated Oct. 2, 2019.

(Continued)

*Primary Examiner* — Isaac G Smith
(74) *Attorney, Agent, or Firm* — Morgan, Lewis & Bockius LLP

(57) ABSTRACT

The present disclosure relates to a steering control apparatus and method, and a steering system. The steering controller manages the access right to the shared resource so that the access to the shared resource shared with the other steering controller is not overlapped with the other steering controller by using the shared resource manager, and controls the steering of the vehicle by accessing the shared resource according to the access right to the shared resource.

15 Claims, 10 Drawing Sheets

(56) References Cited

FOREIGN PATENT DOCUMENTS

| | | |
|---|---|---|
| JP | 2011-020481 A | 2/2011 |
| JP | 2015-081013 A | 4/2015 |
| JP | 2016-001953 A | 1/2016 |
| KR | 10-0693965 B1 | 3/2007 |

OTHER PUBLICATIONS

Office Action issued in corresponding Korean Application No. 10-2018-0052662, dated Jun. 3, 2019.

* cited by examiner

STEERING CONTROL APPARATUS AND STEERING CONTROL METHOD AND, STEERING SYSTEM

CROSS REFERENCE TO RELATED APPLICATION

This application claims priority from Korean Patent Application No. 10-2018-0052662, filed on May 8, 2018, which is hereby incorporated by reference for all purposes as if fully set forth herein.

BACKGROUND OF THE INVENTION

1. Field of the Invention

The present disclosure relates to a steering system of the vehicle, and more particularly, to a steering control apparatus and method, and a steering system.

2. Description of the Prior Art

Generally, the steering system may mean a system in which the driver of the vehicle can change the steering angle of the vehicle wheel based on the steering force (or rotational force) applied to the steering wheel. In recent years, an electric power steering system of an EPS (Electric Power Steer) has been applied to vehicles in order to reduce the steering force of the steering wheel to ensure the stability of the steering state.

Such an electric power steering system may drive the steering motor according to the speed state of the vehicle and the torque state applied to the steering wheel so as to provide a light and comfortable steering feeling to the driver of the vehicle at low speeds and to provide a heavy and secure steering feeling to the driver at high speeds. In addition, the electric power steering system may control the steering to be performed rapidly in an emergency condition thereby to provide an optimum steering state.

Particularly, in recent years, the demand for redundancy and reliability for a steering apparatus of the vehicle is increasing.

SUMMARY OF THE INVENTION

For this background, an object of the present disclosure is to provide the steering control apparatus and method and the steering system capable of improving redundancy and reliability.

In accordance with an aspect of the present disclosure, there is provided a steering control apparatus including: a shared resource manager for managing access rights to a shared resource so that access to the shared resource shared with the other steering control devices is not overlapped with the other steering control devices; and a controller for controlling a steering of a vehicle by accessing the shared resource according to the access right for the shared resource.

In accordance with another aspect of the present disclosure, there is provided a steering control method including: managing access rights to a shared resource so that the accesses to the shared resource of a first steering controller and a second steering controller do not overlap with each other; and controlling a steering motor by accessing the shared resource by the first steering controller or second steering controller according to the access right to the shared resource.

In accordance with another aspect of the present disclosure, there is provided a steering system including: at least two steering controllers sharing a shared resource; and a communication network connecting the at least two steering controller to each other, wherein each of the at least two steering controller manages an access right to the shared resource so that the access to the shared resource does not overlap with the other steering controller and controls a steering motor by accessing the shared resource according to the access right for the shared resource.

As described below, according to the present disclosure, it is possible to eliminate the simultaneous access condition to the shared resource, thereby improving the redundancy and reliability of the steering system by managing access rights to the shared resource so that access to the shared resource shared with the other steering control devices is not overlapped with the other steering control devices by using the shared resource manager, and by controlling a steering of the vehicle by accessing the shared resource according to the access right for the shared resource by using the controller.

Further, according to the steering system of the present embodiment, it is possible to eliminate the simultaneous access condition for the shared resource between the ECU-1 and the ECU-2 through the binary semaphore technique and to perform the distributed arbitration control of the redundancy system.

Furthermore, according to the steering system of the present embodiment, in a multiple device environment, it is possible to limit the overlap of running time between devices for shared resources (for example, motor, CAN, etc.).

Furthermore, according to the steering system of the present embodiment, it is possible to eliminate the running time overlapping between devices for the shared resource and to provide the optimization of the synchronization time, the deadlock estimation and pre-validation in controlling multiple devices.

DETAILED DESCRIPTION OF THE EXEMPLARY EMBODIMENTS

Figure 1:
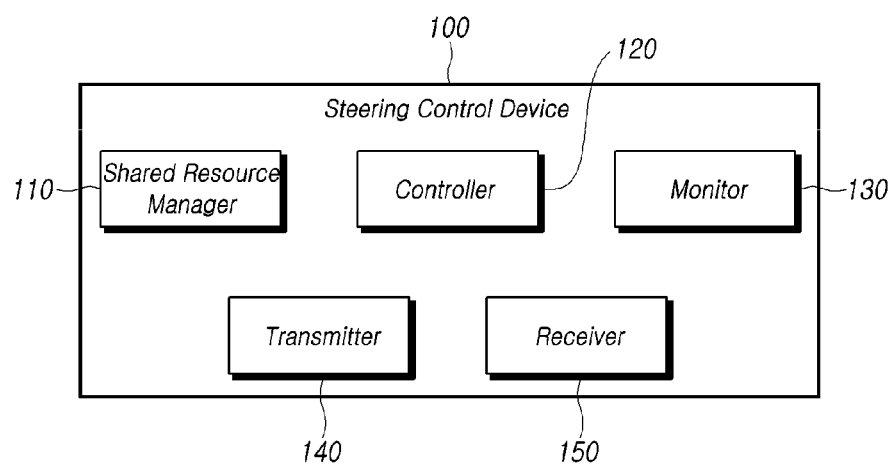
FIG. 1 is a block diagram for explaining the steering control apparatus according to an embodiment of the present disclosure.

In the following description of examples or embodiments, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only".

As used herein, singular forms are intended to include plural forms unless the context clearly indicates otherwise.

Terms, such as "first", "second", "A", "B", "(A)", or "(B)" may be used herein to describe elements of the disclosure.

Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can"

Hereinafter, the steering control apparatus according to the present embodiments will be described with reference to the accompanying drawings.

FIG. 1 is a block diagram for explaining the steering control apparatus according to an embodiment of the present disclosure.

Referring to FIG. 1, the steering control device 100 or the steering control apparatus according to the present embodiment may include a shared resource manager 110 and a controller 120.

The shared resource manager 110 may manage the access right to the shared resource so that the access to the shared resources shared with the other steering apparatus does not overlap with the other steering control apparatus.

Specifically, there may be a plurality of steering control apparatuses or steering control devices. Hereinafter, one of the plurality of steering control devices will be described as a reference steering control device (hereinafter, referred to as the steering control device 100). Thus, the other steering control device refers to a steering control device other than the steering control device 100, but may include a component such as the steering control device 100. That is, the other steering control device and the steering control device 100 may be duplicated and include the same components.

The shared resource manager 110 may manage access rights to the shared resource using a semaphore or a semaphore technologies. That is, the shared resource manager 110 may manage the access rights to the shared resources by using the semaphore so that accesses to the shared resources shared with other steering control apparatuses does not overlap with other steering control apparatuses. Here, a problem may occur when multiple processes access the shared resource at the same time. In this case, the semaphore may be at least one of software and hardware that can restrict access to only one process to the shared resource.

Here, the semaphore may be a binary semaphore, but it is not limited thereto and may be a counting semaphore.

The steering control device 100 and the other steering control devices may use the shared resources so that they do not overlap with each other according to access rights to shared resources. Here, the shared resource means a component that can be mutually shared among the components included in the steering system 200 by the steering control device 100 and the other steering control device. The shared resources may include, for example, a steering motor 220 and CAN (CAN) communications and the like.

The steering control device 100 and the other steering control device may access (or control) shared resources that are shared by the steering control device 100 and the other steering control device. At this time, the shared resource manager 110 may control the steering control device 100 and the other steering control devices to access the shared resources without overlapping each other. That is, the shared resource manager 110 may manage the access right to the shared resource so that the state in which the steering control device 100 and the other steering control device access the shared resource at the same time does not occur.

The controller 120 may control the steering of the vehicle by accessing the shared resource according to the access right granted to the shared resource.

Specifically, the controller 120 may be connected to the shared resource manager 110. The controller 120 may receive the access right information on the shared resource from the shared resource manager 110 and may access the shared resource according to the access right information (for example, the accessible information or the inaccessible information) and control the steering of the vehicle (for example, the steering motor 220). If the controller is provided with the accessible information on the shared resource from the shared resource manager, the corresponding steering control device or the corresponding controller may access the shared resource to control the steering of the vehicle, and the other steering control device may be postpone access to the shared resource.

The steering control device 100 according to the present embodiment may further include a monitoring unit or a monitor 130, a transmitter 140 and a receiver 150.

The monitor 130 may monitor the status of the controller 120. Here, monitoring the status of the controller 120 may mean monitoring not only the status of the controller 120 but also all the statuses related to the steering control device 100.

Specifically, the monitor 130 may be connected to the controller 120. The monitor 130 may monitor the status of the controller 120 and generate a first monitoring result according to the monitoring result. Here, the first monitoring result may include first failure state information indicating a failure state of the controller 120. The monitor 130 may provide the first monitoring result to the controller 120. The monitor 130 may provide the first monitoring result to the transmitter 140.

The transmitter 140 may transmit the first monitoring result of the monitor 130 to another steering control device.

Specifically, the transmitter 140 may be connected to the controller 120. The transmitter 140 may receive the first monitoring result through the controller 120. The transmitter 140 may transmit the first monitoring result received through the controller 120 to another steering control device.

The transmitter 140 may be connected to the monitor 130. The transmitter 140 may receive the first monitoring result from the monitor 130. The transmitter 140 may transmit the first monitoring result received from the monitor 130 to another steering control device.

The receiver 150 may receive the second monitoring result from another steering control device.

Specifically, the receiver 150 may be connected to another steering control device. The receiver 150 may receive the second monitoring result generated by the other steering control device from another steering control device. Here, the second monitoring result may include second failure state information indicating a failure state of the other steering control device. The receiver 150 may provide the controller 120 with the second monitoring result received from another steering control device.

Here, the transmitter 140 and the receiver 150 may include at least one of a wired communication device and a wireless communication device. In particular, the transmitter 140 and the receiver 150 may include a control area network (CAN) communication unit, but not limited thereto, and may include any communication unit as long as they can connect between the steering control devices 100.

Referring to FIG. 1, the shared resource manager 110 may provide or grant the access right for the shared resource to the steering control device 100 or the other steering control device.

For example, the shared resource manager 110 may provide the access right for the shared resource to the steering control device 100 or the other steering control device in accordance with the turn-on sequence of the steering control device 100 and the other steering control device. That is, if the steering control device 100 is first turned on, the shared resource manager 110 may provide the access right to the shared resource to the steering control device 100.

In addition, the shared resource manager 110 may provide the access right to the shared resource to the steering control device 100 or the other steering control device depending on whether the steering control device 100 or the other steering control device has failed. That is, if the steering control device 100 or the other steering control device is turned on but the other steering control device is in the failure state, the shared resource manager 110 may provide the access right to the shared resource to the steering control device 100. In particular, if the other steering control device is turned on first but the other steering control device is in the failure state, the shared resource manager 110 may provide the access right to the shared resource to the steering control device 100.

If the shared resource manager 110 provides the controller 120 with the access right to the shared resource, the controller 120 may access the shared resource and control the steering of the vehicle. At this case, the other steering control device may be blocked from accessing to the shared resource and restrict access to the shared resource.

If the controller 120 is in the failure state according to the first monitoring result of the monitor 130, the controller 120 may block access to the shared resource. That is, if the controller 120 is changed from the normal state to the failure state according to the first monitoring result of the monitor 130, the controller 120 may block access to the shared resource and restrict access to the shared resource. The transmitter 140 may provide the first failure state information to the other steering control device. At this case, the other steering control device is changed from a block state to an unblock state according to the first failure state information, and can control the steering of the vehicle by accessing the shared resource.

If the shared resource manager 110 provides the access right to the shared resource to the other steering control device, the controller 120 may block access to the shared resource. That is, if the shared resource manager 110 provides the access right to the shared resource to the other steering device, the other steering control device can access the shared resource to control the steering of the vehicle, and the controller 120 may block access to the shared resource so that access to the shared resource of the controller 120 may be restricted.

If the receiver 150 receives the second failure status information as the second monitoring result from the other steering control device, the controller 120 unblocks access to the shared resource and can access the shared resource to control the steering of the vehicle. That is, in the case that the receiver 150 receives the second failure status information as the second monitoring result from the other steering control device, the other steering control device is blocked so that access to the shared resource may be restricted, and the controller 120 may access the shared resource and control the steering of the vehicle by being converted from an access block state to an unblock state for the shared resource.

If the controller 120 is in the failure state according to the first monitoring result of the monitor 130, the controller 120 may control the steering of the vehicle to be operated manually. That is, in the case that the other steering control device is in the failure state and the controller 120 is changed from the normal state to the failure state according to the first monitoring result of the monitor, the controller 120 may control the steering of the vehicle to be performed in the manual operation.

Meanwhile, in the case that the shared resource manager 110 provides the access right to the shared resource to the controller 120 due to the failure state of the other steering control device or the other steering controller, the controller 120 may access the shared resource to control the steering of the vehicle. That is, if the other steering control device is turned on first but the other steering control devices is in the failure state, the shared resource manager 110 can provide access rights to the shared resource to the controller 120, thereby the controller 120 can access the shared resource and control the steering of the vehicle.

Further, if the controller 120 is in the failure state as a result of the first monitoring of the monitor 130, the controller 120 may hold access to the shared resource. That is, if the other steering control device is in a failure state and the controller 120 is changed from the normal state to the failure state, the shared resource manager 110 does not provide the access to the shared resource to the other steering control device because the other steering control device is in a failure state and may control the access to the shared resource of the controller 120 to be held. At this time, a "hold semaphore flag" may be used to indicate the holding state of access to the shared resource.

The steering control device 100 according to the present embodiment may include an ECU (Electronic Control Unit), but is not limited thereto, and any control device (or system) may be included if it is an electronically controllable device (or system).

The steering control device 100 according to the present embodiment may further include a sensor unit, a controller (i.e., a control unit) monitoring unit, a steering motor power unit, a power conversion unit and the like.

The sensor unit may acquire status information on the steering control device by measuring the state of the steering control device. The sensor unit may include a temperature sensor, a current sensor and a motor position sensor. However, the sensor unit of the present embodiment is not limited thereto and may include any sensor as long as it can measure the state of the steering control device of the vehicle.

The controller monitoring unit may monitor the operation state of the controller 120. The controller monitoring unit may include a watchdog, but is not limited thereto, and may include any device capable of monitoring the controller 120. For example, the watchdog may include a window watchdog with a start and an end as a deadline.

The steering motor power unit may receive the power (DC/AC voltage or current) from the power conversion unit, may convert the power according to the gate signal to generate the assist current. The steering motor power unit may provide the assist motor with the assist current. The steering motor power unit may include a gate driver, an inverter, and a phase disconnector (PCO).

The power conversion unit may receive power (DC/AC voltage or current) from a power supply unit (for example, battery or the like) and may perform power conversion to generate the operating voltage required for the components of the steering control device 100 and the power supplied to the steering motor power supply unit. The power conversion unit may include, but is not limited to, a regulator.

As described above, in the steering control apparatus or the steering control device according to the present embodiment, it is possible to eliminate the simultaneous access condition to the shared resource, thereby improving the redundancy and reliability of the steering system by managing access rights to the shared resource so that access to the shared resource shared with the other steering control devices is not overlapped with the other steering control devices by using the shared resource manager, and by controlling a steering of the vehicle by accessing the shared resource according to the access right for the shared resource by using the controller.

Figure 2:
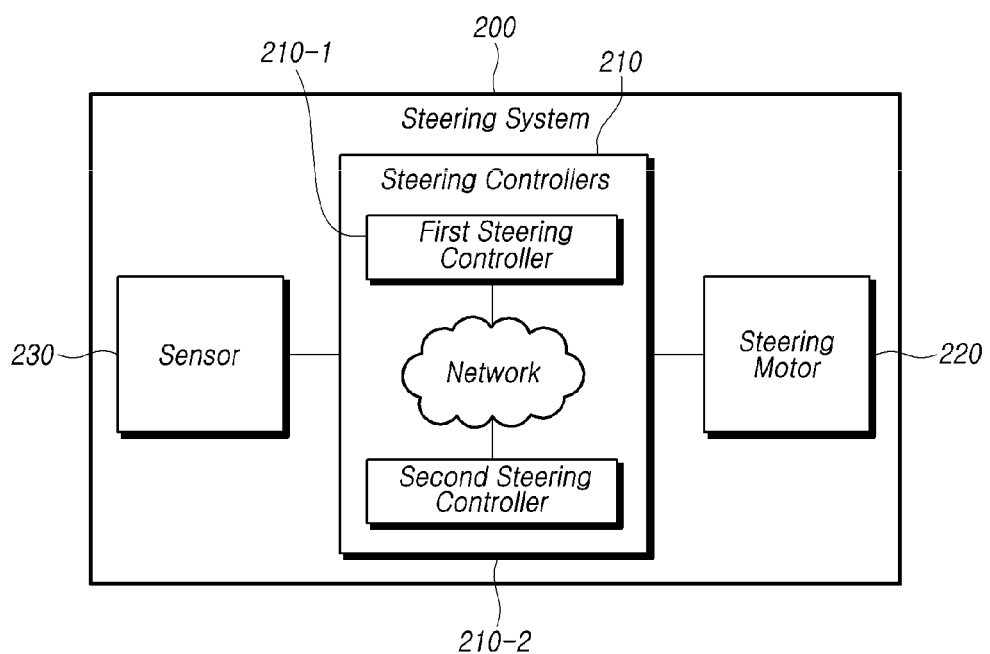
FIG. 2 is a block diagram for explaining the steering system according to the present disclosure.

FIG. 2 is a block diagram for explaining the steering system according to the present disclosure.

Referring to FIG. 2, the steering system 200 according to the present embodiments may include a steering controller 210, a communication network and the like.

Here, the steering controller 210 according to the present embodiment may be the same component as the steering control device 100 described above with reference to FIG. 1. The steering controller 210 may perform all the functions of the steering control device 100 described above with reference to FIG. 1 and may include a shared resource manager 110, a controller 120, a monitor 130, a transmitter 140, a receiver 150, a sensor unit, a controller (i.e., a control unit) monitoring unit, a steering motor power unit, and a power conversion unit.

That is, in this specification, the steering control unit, the steering controller, the controller or the control unit may be used in the same meaning as the steering control device.

Each of the steering controllers 210 may share the shared resources. Each of the steering controllers 210 may be connected to each other through a communication network. Here, the communication network may include at least one of a wired communication network or a wireless communication network. In particular, the communication network may include, but is not limited to, a control area network (CAN), and may include any communication network as long as it can connect between the steering controllers 210 each other.

Each of the steering controllers 210 may manage the access right to the shared resource so that the access to the shared resource is not overlapped with the other steering controller, and may control the steering motor 220 by accessing the shared resource according to the access right for the shared resource.

Each of the steering controllers 210 may manage access rights to the shared resource by using the semaphore. That is, each of the steering controllers 210 may manage the access right to the shared resource by using the semaphore so that access to the shared resource shared with the other steering controller does not overlap with the other steering controller.

Here, a problem may occur when multiple processes access the shared resource at the same time. In this case, the semaphore may be at least one of software and hardware that can restrict access to only one process to the shared resource.

Here, the semaphore may be the binary semaphore, but it is not limited thereto and may be the counting semaphore.

Specifically, each of the steering controllers 210 may be configured with a plurality of steering controllers. In particular, each steering controller 210 may include the first steering controller 210-1 and the second steering controller 210-2 as shown in FIG. 2. Hereinafter, it will be assumed that there are two steering controller 210 for simplifying the explanation. However, the following descriptions may be applied to three or more steering controllers 210 as well.

Hereinafter, the first steering controller 210-1 will be described as a reference. Accordingly, the second steering controller 210-2 may refer to the other steering controller other than the first steering controller 210-1, and may include the same components as the first steering controller 210-1. That is, the first steering controller 210-1 and the second steering controller 210-2 may be redundant and include the same components.

The first steering controller 210-1 and the second steering controller 210-2 may use shared resources so that they do not overlap with each other according to access rights to the shared resources. Here, the shared resource may be a component that the first steering controller 210-1 and the second steering controller 210-2 can share among the components included in the steering system 200. For example, the shared resource may be the steering motor 220, a CAN (CAN) communication and the like.

The first steering controller 210-1 and the second steering controller 210-2 can access the shared resources shared by the first and second steering controllers 210-1 and 210-2. At this time, the first steering controller 210-1 and the second steering controller 210-2 may manage the access rights for the shared resource so that they can access the shared resources without overlapping with each other to eliminate the condition of simultaneous access to shared resources.

The first steering controller 210-1 and the second steering controller 210-2 may control the steering motor 220 by accessing the shared resource according to the access right (accessibility or inaccessibility) to the shared resource.

The first steering controller 210-1 may monitor the status of the first steering controller 210-1 to generate the first monitoring result and transmit the first monitoring result to the second steering controller 210-2 through the communication network. Here, the first monitoring result may include a first failure state information indicating a failure state of the first steering controller 210-1.

The second steering controller 210-2 may monitor the status of the second steering controller 210-2 to generate the second monitoring result and transmit the second monitoring result to the first steering controller 210-1 through the communication network. Here, the second monitoring result may include a second failure state information indicating a failure state of the second steering controller 210-2.

Referring to FIG. 2, the first steering controller 210-1 and the second steering controller 210-2 may have access rights to the shared resource based on the turn-on sequence thereof. That is, if the first steering controller 210-1 is turned on first, the first steering controller 210-1 may have access rights to the shared resources.

In addition, the first steering controller 210-1 and the second steering controller 210-2 may have access rights to the shared resources depending on whether each controller has a failure. That is, if the first steering controller 210-1 and the second steering controller 210-2 are turned on, but the second steering controller 210-2 is in a failure state, the first steering controller 210-1 may have access rights to the shared resources. That is, if the second steering controller 210-2 is first turned on but the second steering controller 210-2 is in a failure state, the first steering controller 210-1 may have the access right to the shared resource.

If the first access controller 210-1 has access rights to the shared resource, the first steering controller 210-1 can access the shared resource and control the steering motor 220. At this case, the second steering controller 210-2 may block access to the shared resource thereby the access to the shared resource by the second steering controller 210-2 may be restricted.

If the first monitored controller 210-1 is in a failure state, the first steering controller 210-1 blocks access to the shared resource, and first monitored controller 210-1 may provide the first failure state information to the second steering controller 210-2. That is, if the first steering controller 210-1 is changed from the normal state to the failure state according to the first monitoring result, the first steering controller 210-1 may block access to the shared resource and the access to shared resources is restricted, and may provide the first failure state information to the second steering controller 210-2.

At this case, the second steering controller 210-2 may unblock access to the shared resource according to the first failure state information, and may control the steering motor 220 by accessing the shared resource. That is, if the second steering controller 210-2 receives the first failure state information from the first steering controller 210-1, the second steering controller 210-2 may recognizes that the first steering controller 210-1 is in a failure state, and may control the steering motor 220 by accessing the shared resource by changing the access to the shared resource from the block state to the unblock state.

If the second steering controller 210-2 is in a failure state according to the second monitoring result, the second steering controller 210-2 can control the steering of the vehicle to be operated manually. That is, if the first steering controller 210-1 is in a failure state and the second steering controller 210-2 is changed from the normal state to the failure state according to the second monitoring result, the second steering controller 210-2 may control the steering of the vehicle to be operated manually.

Alternatively, if the first steering controller 210-1 has access right to the shared resource due to the failure state of the second steering controller 210-2, the first steering controller 210-1 may control the steering motor 220 by accessing the shared resource. That is, if the second steering controller 210-2 is first turned on but the second steering controller 210-2 is in a failure state, the first steering controller 210-1 may have the access right to the shared resource, and the first steering controller 210-1 may control the steering motor 220 by accessing the shared resource.

If the first steering controller 210-1 is in a failure state, the first steering controller 210-1 may hold the access to the shared resource. That is, if the second steering controller 210-2 is in a failure state and the first steering controller 210-1 is changed from a normal state to a failure state, the first steering controller 210-1 may not provide the access to the shared resource to the second steering controller 210-2, and may hold access to the shared resource to itself since the second steering controller 210-2 is in a failure state. At this time, the "hold semaphore flag" may be used to indicate the holding state of access to the shared resource.

The steering controller 210 according to the present embodiment may include an electronic control unit (ECU), but is not limited thereto, may include any control unit (or system) as long as it is an electronically controllable device (or system).

The steering system 200 according to the present embodiments may include a sensor 230, a steering motor 220, and the like.

The sensor 230 may obtain status information of the vehicle by measuring status of the vehicle. The sensor 230 may provide the state information of the vehicle to the first steering controller 210-1 and the second steering controller 210-2.

For example, the sensor 230 may include at least one steering torque sensor and at least one steering angle sensor.

At least one steering torque sensor may measure the torque applied to the steering wheel to acquire torque information of the steering wheel. At least one steering torque sensor may provide torque information of the steering wheel to the first steering controller 210-1 and the second steering controller 210-2.

At least one steering angle sensor may acquire the steering angle information of the steering wheel by measuring the steering angle of the steering wheel. At least one steering angle sensor may provide the steering angle information of the steering wheel to the first steering controller 210-1 and the second steering controller 210-2.

In particular, in the case that there are a plurality of steering torque sensors and a plurality of steering angle sensors, the plurality of steering torque sensors and the plurality of steering angle sensors may be duplicated. That is, if there are two steering torque sensors, the first steering torque sensor and the second steering torque sensor may be duplicated so that the torque information of the steering wheel generated by the first steering torque sensor is transmitted to the first steering controller 210-1, and the torque information of the steering wheel generated by the second steering torque sensor may be provided to the second steering controller 210-2. If there are two steering angle sensors, the first steering angle sensor and the second steering angle sensor may be duplicated so that the steering angle information of the steering wheel generated by the first steering angle sensor may be provided to the first steering controller 210-1, and the steering angle information of the steering wheel generated by the second steering angle sensor may be provided to the second steering controller 210-2.

The first steering controller 210-1 may generate the first assist current based on at least one of the torque information of the steering wheel and the steering angle information of the steering wheel, and may control the steering motor 220 based on the first assist current.

The second steering controller 210-2 may generate the second assist current based on at least one of the torque information of the steering wheel and the steering angle information of the steering wheel, and may control the steering motor 220 based on the second assist current.

At this case, the first steering controller 210-1 and the second steering controller 210-2 may access the steering motor 220 without overlapping each other, and may provide the first assist current and the second assist current to the steering motor 220 and control the steering motor 220 based on the assist current.

The steering motor 220 may include at least one of a single winding type motor or a dual winding type motor, but is not limited thereto, and may include any type of motor as long as it can provide an auxiliary assist force to the vehicle wheels.

As described above, in the steering system according to the present embodiment, it is possible to eliminate the simultaneous access condition to the shared resource, thereby improving the redundancy and reliability of the steering system by managing access rights to the shared resource so that access to the shared resource shared with the other steering control devices is not overlapped with the other steering control devices by using each steering controller, and by controlling a steering of the vehicle by accessing the shared resource according to the access right for the shared resource by using each steering controller.

Figure 3:
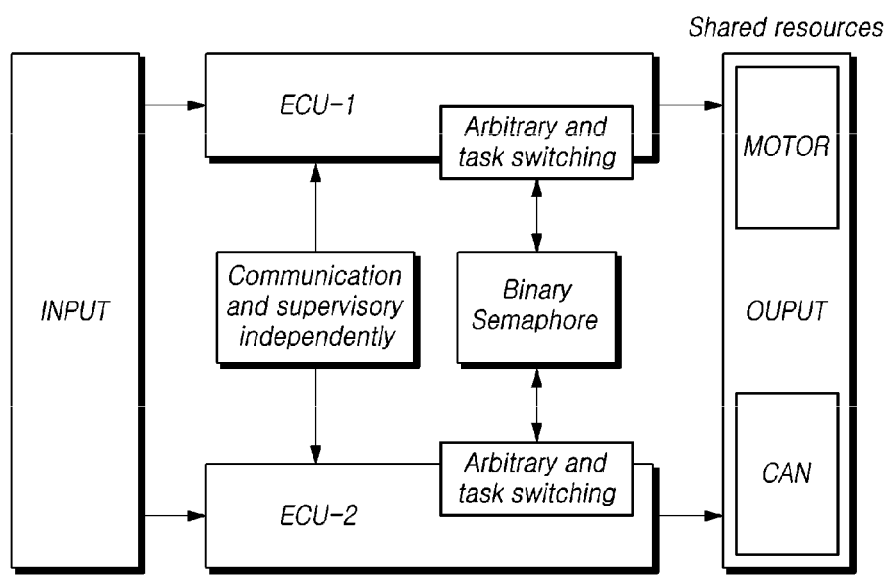
FIG. 3 is a conceptual diagram for explaining the concept of the steering system according to the present disclosures.

FIG. 3 is a conceptual diagram for explaining the concept of the steering system according to the present disclosures.

Referring to FIG. 3, the INPUT in the figure may include a sensor 230 of the steering system 200 according to the present embodiments and the ECU-1 may include the first steering controller 210 of the steering system 200 according to the present embodiments, and the ECU-2 may include the second steering controller 210-2 of the steering system 200 according to the present embodiments. The motors of the shared resources may include the steering motors 220 of the steering system 200 according to the present embodiments and the CAN of the shared resources may include the CAN of the steering system 200 according to the present embodiments.

The INPUT may provide torque information of the steering wheel and steering angle information of the steering wheel. In particular, if the INPUT is duplicated, the INPUT may provide the torque information of the steering wheel generated by the first steering torque sensor to the ECU-1, and may provide the torque information of the steering wheel generated by the second steering torque sensor to the ECU-2. The INPUT may provide the steering angle information of the steering wheel generated by the first steering angle sensor to the ECU-1, and may provide the steering angle information of the steering wheel generated by the second steering angle sensor to the ECU-2.

The ECU-1 may generate the first assist current based on at least one of the torque information of the steering wheel and the steering angle information of the steering wheel, and may control the MOTOR, which is one of the shared resources, based on the first assist current.

The ECU-2 may generate the second assist current based on at least one of the torque information of the steering wheel and the steer angle information of the steering wheel, and may control the MOTOR as one of the shared resources based on the second assist current.

At this case, the ECU-1 and the ECU-2 may access the motor using the binary semaphore without overlapping each other, and may provide the first assist current and the second assist current to the MOTOR, and may control the motor based on the first assist current and the second assist current. Specifically, the state value of the semaphore may be '1' if the shared resource is not occupied by any one ECU, and may be '0' if the shared resource is occupied by any one of the ECUs. The access right to the shared resource is changed or controlled by changing the semaphore state value from '0' to '1' or from '1' to '0'.

As described above, the steering system according to the present embodiments may eliminate the simultaneous access condition for the shared resources between the ECU-1 and the ECU-2 by using the binary semaphore technique. As a result, the steering system according to the present embodiments may perform the distributed arbitration control of the redundancy system.

The steering system according to the present embodiments may perform a function of limiting overlapping of running time between devices for a shared resource (e.g., a motor, a CAN, etc.) in a multiple devices environment.

That is, the steering system according to the present embodiments may eliminate the running time overlapping problem between devices for shared resources, and may enables the synchronization timing optimization, the deadlock estimation and pre-validation in the control of multiple devices.

Figure 4:
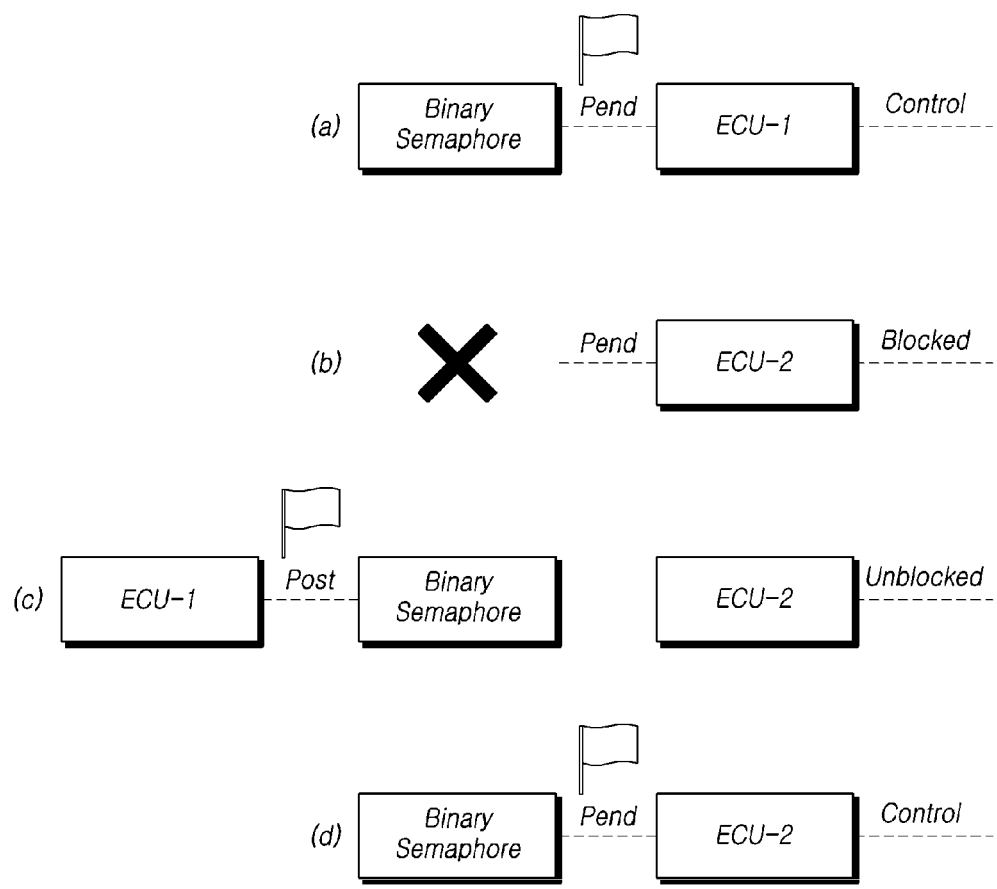
FIG. 4 is a diagram for explaining steering system control using a binary semaphore according to the present disclosures.

FIG. 4 is a diagram for explaining steering system control using a binary semaphore according to the present disclosures.

Referring to FIG. 4, as shown in (a) of FIG. 4, when the ECU-1 requests the binary semaphore, the ECU-1 may receive the binary semaphore via a Pend function (Pend semaphore flag), and may access and control the shared resource.

As shown in (b) of FIG. 4, in the case that the ECU-1 receives the binary semaphore and accesses the shared resource to control the shared resource, the ECU-2 may be blocked because the ECU-2 cannot receive access rights to the shared resource even if the ECU-2 requests the binary semaphore.

As shown in (c) of FIG. 4, the ECU-1 can provide a post semaphore flag of the binary semaphore when the state of the ECU-1 changes from a normal state to a failure state, and then the ECU-2 may be changed from a block state to an unblock state.

As shown in (d) of FIG. 4, if the ECU-2 requests the binary semaphore, the ECU-2 may receive the Pend semaphore flag of the binary semaphore and may access the shared resource to control the shared resource.

Figure 5:
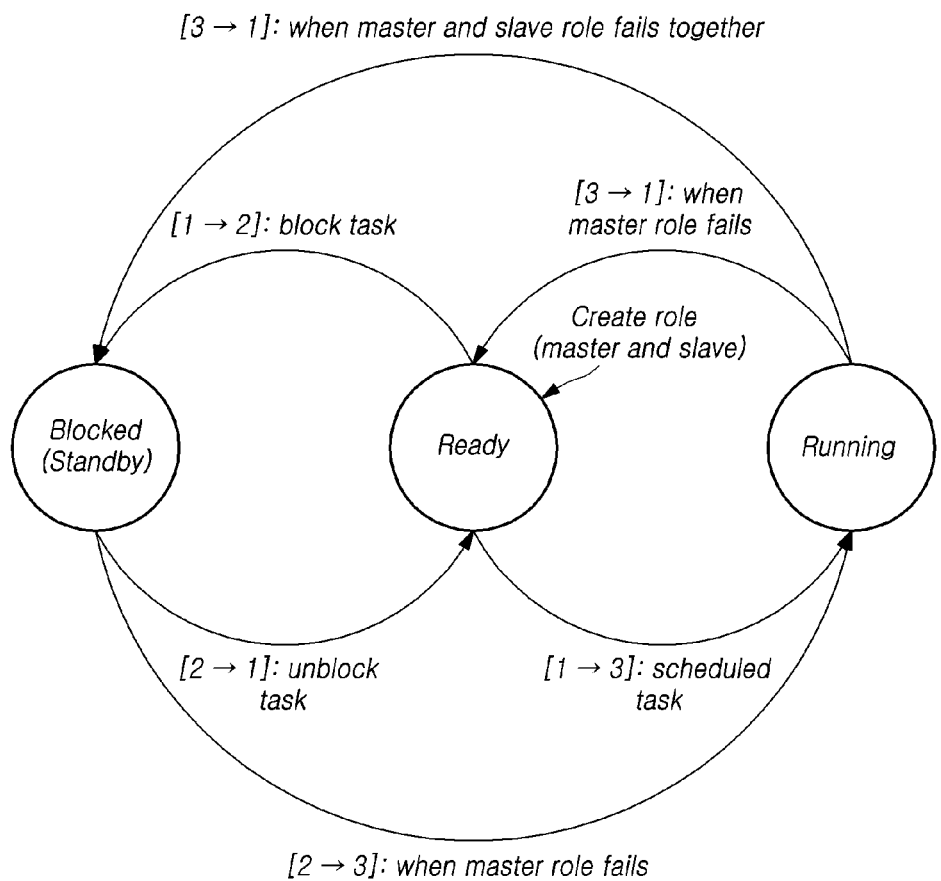
FIG. 5 is a diagram for explaining a state of a binary semaphore according to the present disclosures.

FIG. 5 is a diagram for explaining a state of the binary semaphore according to the present disclosures.

Referring to FIG. 5, the state of the binary semaphore according to the present embodiments may include a ready state, a blocked state, a standby state, and a running state. Here, the ready state may be an unblock state.

Master and slave may be selected in the ready state (1). If a scheduled task is performed, the ready state (1) may be changed to the running state (3) (1→3). If the block task is performed, the ready state 1 may be changed to the block state 2 (1→2). In one example, in the ready state 1, the ECU-1 may be determined as the master and the ECU-2 may be determined as the slave. If the scheduled task is performed, the ECU-1 changes from the ready state (1) to the running state (3) (1→3). If the block task is executed, the ECU-2 changes from the ready state (1) to the block state (2) (1→2) since the shared resource is assigned to the ECU-1. That is, the ECU-1 may obtain the access right to the shared resource and may control the steering motor, and the ECU-2 may be in standby state. At this time, each of ECU-1 and ECU-2 may perform monitoring for itself or for each other.

Thereafter, when the unblock task is performed, the state changes from the block state 2 to the ready state 1 (2→1), and in the ready state 1 according to the scheduled task. The state may be changed from ready state (1) to running state (3) (1→3) according to the scheduled task. Alternatively, if the master is in a failure state, the state may be changed from the block state (2) to the running state (3) (2→3). If the master is in the failure state, the state may be changed from the running state (3) to the ready state (1) (3→1). If both the master and slave are in failure states, the state may be changed from running state (3) to block state (2) (3→2).

In addition, if a failure occurs in the ECU-1, the ECU-2 may detect the failure of the ECU-1, and the post-semaphore flag may be output and the state value of the semaphore may increase. Then, the ECU-1 is changed from the running state (3) to the ready state (1), and the ECU-2 may be unblocked and may control the steering motor by acquiring the access right to the shared resource.

Figure 6:
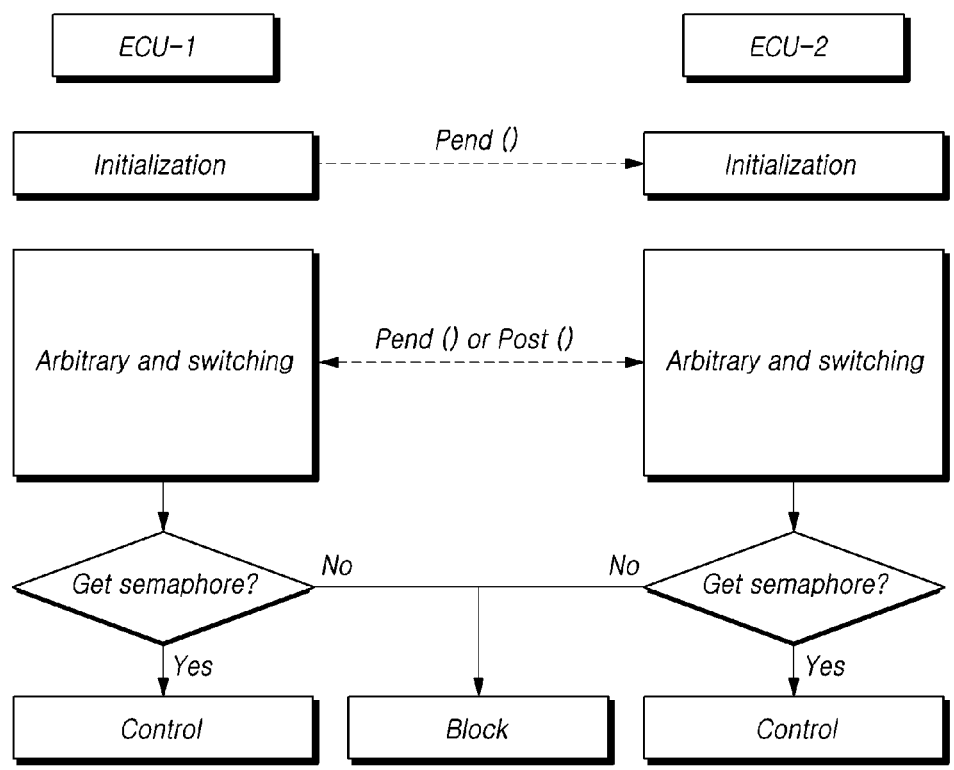
FIG. 6 is a diagram for explaining a flow of a binary semaphore according to the present disclosures.

FIG. 6 is a diagram for explaining a flow of a binary semaphore according to the present disclosures.

Referring to FIG. 6, the ECU-1 and ECU-2 may have access rights to the shared resource in the order that they are turned on at initialization. That is, if the ECU-1 is first turned on, the ECU-1 may have access right to the shared resource using the Pend function.

Thereafter, the ECU-1 and ECU-2 can change their states by using the Pend function and the Post function, respectively, while monitoring themselves and exchanging the monitoring results with each other.

That is, the ECU-1 and ECU-2 may access the shared resource and control the shared resource in the case that the semaphore is obtained, and may be blocked if the semaphore is lost.

Hereinafter, the steering control method according to the present embodiments will be described with reference to the accompanying drawings. Particularly, the description for the steering control device and the steering system according to the embodiments described above with reference to FIGS. 1 to 6 will be omitted in the following for simplifying the explanation. The steering control method according to the present embodiments can be performed by the steering control device.

Figure 7:
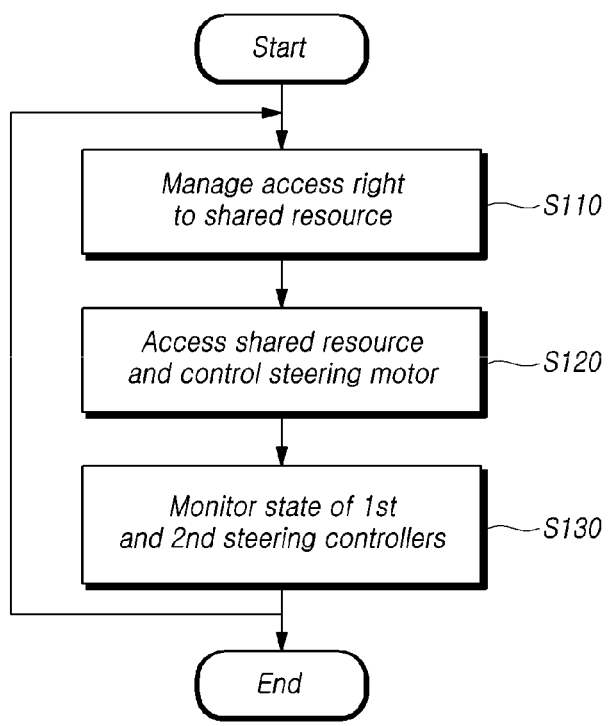
FIGS. 7 to 9 are flowcharts for explaining the steering control method according to the present disclosures.
Figure 8:
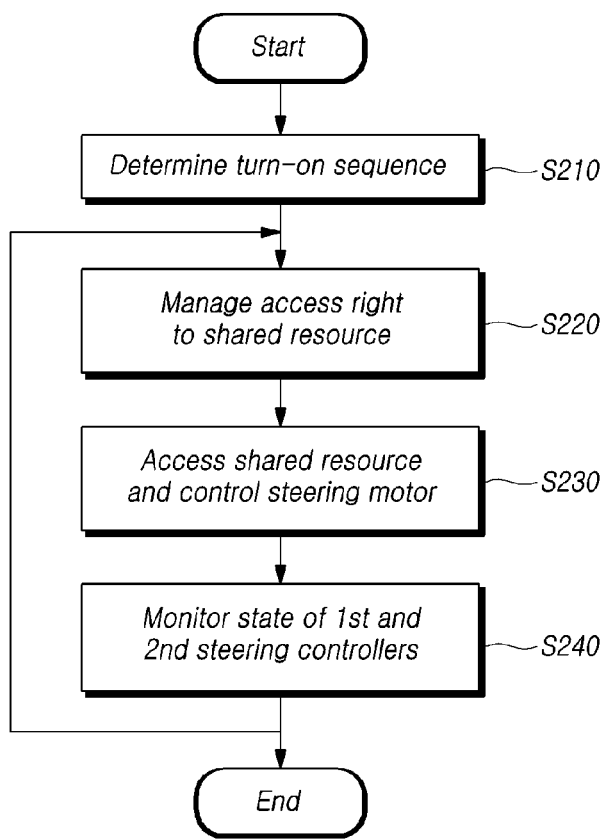
Figure 9:
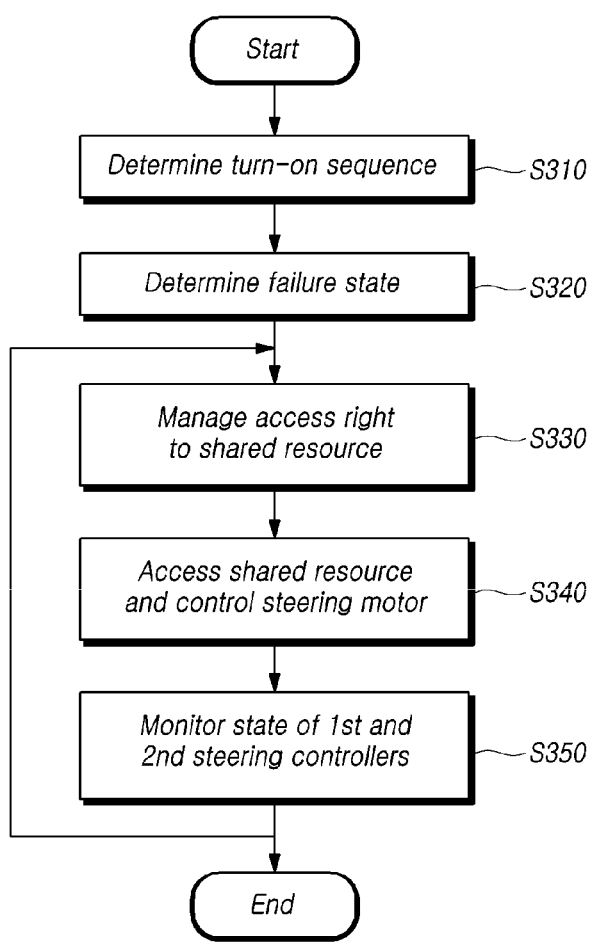

FIGS. 7 to 9 are flowcharts for explaining the steering control method according to the present disclosures.

Referring to FIG. 7, the steering control method according to the present embodiments may include a step of managing the access right to the shared resource, a step of controlling the steering motor by accessing the shared resource, and a step of monitoring.

The first steering controller and the second steering controller may manage the access rights to the shared resource so that accesses to the shared resources do not overlap each other (S110).

In step S110, the access right to the shared resource may be managed using the semaphore. That is, in step S110, the access right to the shared resource may be managed using the semaphore so that the accesses to the shared resources of the first and second steering controllers are not overlapped with each other.

Here, a problem may occur when multiple processes access the shared resource at the same time. In this case, the semaphore may be at least one of software and hardware that can restrict access to only one process to the shared resource.

Here, the semaphore may be the binary semaphore, but it is not limited thereto and may be the counting semaphore.

Thereafter, the first steering controller or the second steering controller may access the shared resource to control the steering motor according to the access right to the shared resource (S120).

The states of the first steering controller and the second steering controller may be monitored (S130).

For example, the state of the first steering controller may be monitored to generate the first monitoring result, and the first monitoring result may be transmitted to the second steering controller. Here, the first monitoring result may include first failure state information indicating the failure state of the first steering controller.

The state of the second steering controller may be monitored to generate the second monitoring result, and the second monitoring result may be transmitted to the first steering controller. Here, the second monitoring result may include second failure state information indicating the failure state of the second steering controller.

Thereafter, the first monitoring result and the second monitoring result generated in step S130 may be provided to step S110, and steps S110 to S130 may be repeatedly performed.

Referring to FIG. 8, the turn-on sequence of the first steering controller and the second steering controller may be determined (S210).

In step S220, the first and second steering controllers may manage access rights to the shared resource in order to turn on the shared resources so that accesses to the shared resources do not overlap each other.

That is, if the first steering controller is turned on first, the first steering controller may have the access right to the shared resource, and the access right to the shared resource of the second steering controller may be blocked.

If the first steering control has the access right to the shared resource, the first steering controller can access the shared resource to control the steering motor. At this time, the second steering controller may block the access to the shared resource, thereby limiting access to the shared resource (S230).

If the first monitoring controller is determined in a failure state as a result of the first monitoring, the first failure state information may be generated and provided to the second steering controller (S240).

In step S220, the access to the shared resource of the first steering controller may be blocked, the access to the shared resource of the second steering controller is unblocked, and the second steering controller may have the access right to the shared resource.

Thereafter, step S230 may be performed, and in step S230, the second steering controller may access the shared resource to control the steering motor. That is, if the second steering controller receives the first failure state information from the first steering controller, the second steering controller may recognize that the first steering controller is in a failure state, and the access to the shared resource of the second steering controller changes from the block state to the unblock state, thereby accessing the shared resource to control the steering motor. At this time, the first steering controller may block access to the shared resource, thereby limiting access to the shared resource.

Thereafter, step S240 may be performed. In step S240, if the second steering controller is in a failure state according to the second monitoring result, the second failure state information may be generated.

Thereafter, step S220 may be performed. In step S220, the second steering controller may manage the access right to the shared resource so that steering of the vehicle is operated manually. That is, if the first steering controller is in a failure state and the second steering controller is changed from the normal state to the failure state as a result of the second monitoring, the second steering controller may control the steering of the vehicle to be operated manually.

Referring to FIG. 9, the turn-on sequence of the first steering controller and the second steering controller may be determined (S310).

The failure state of the first steering controller and the second steering controller may be determined (S320).

Then, the access right to the shared resource may be managed according to the turn-on order and the failure state of the first and second steering controllers so that accesses to the shared resources are not overlapped with each other (S330).

That is, if the first steering controller and the second steering controller are turned on, but the second steering controller is in the failure state, the first steering controller may have access rights to the shared resources. That is, if the second steering controller is turned on first but the second steering controller is in the failure state, the first steering controller may have access right to the shared resource.

If the access right to the shared resource is present in the first steering controller due to the failure state of the second steering controller, the first steering controller may access the shared resource to control the steering motor (S340).

If the first steering controller is in a failure state according to the first monitoring result, the first failure state information may be generated (S350).

Thereafter, step S330 may be performed. In step S330, the access to the shared resource of the first steering controller may be held by using the hold semaphore flag. That is, if the second steering controller is in a failure state and the first steering controller is changed from the normal state to the failure state, the first steering controller may hold the access to the shared resource by itself without providing access to the shared resource to the second steering controller since the second steering controller is in the failure state.

Figure 10:
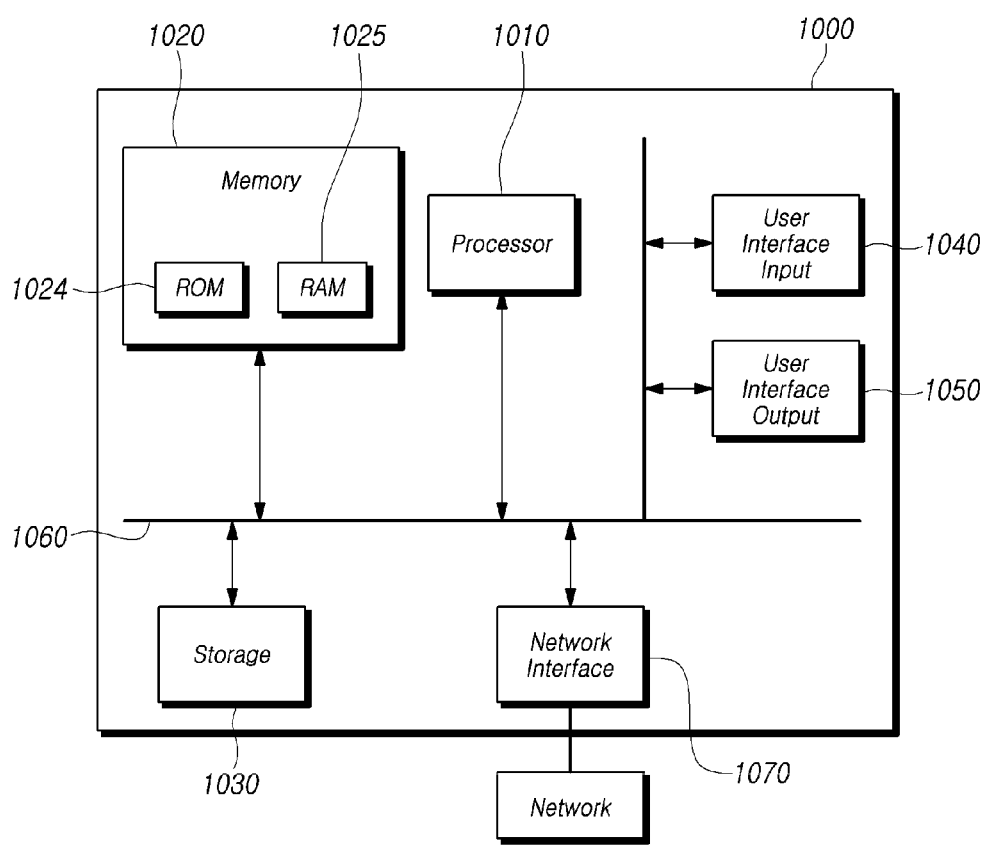
FIG. 10 is a block diagram of a computer system as the steering control apparatus according to the present disclosures.

FIG. 10 is a block diagram of a computer system as the steering control apparatus according to the present disclosures.

The steering controller, the controller or the steering control device according to the above-described embodiments may be implemented as, for example, a computer-readable recording medium in a computer system. As shown in FIG. 10, the computer system 1000 as the steering control device may include at least one or more elements of one or more processors 1010, a memory 1020, a storage 1030, a user interface input 1040 and a user interface output 1050, and these elements may communicate with each other through the bus 1060. In addition, the computer system 1000 may also include a network interface 1070 for connecting to a network.

The processor 1010 may be a CPU or a semiconductor device that executes processing instructions stored in the memory 1020 and/or the storage 1030. The memory 1020 and storage 1030 may include various types of volatile/non-volatile storage media. For example, the memory may include ROM 1021 and RAM 1023.

Accordingly, the embodiments may be implemented as a computer-implemented method or non-volatile computer storage medium in which the computer-executable instructions are stored. The instructions may perform the method or the functions according to at least one embodiment of the present embodiments by being executed by the processor.

The above description has been presented to enable any person skilled in the art to make and use the invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention.

The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The scope of protection of the present disclosure should be construed based on the following claims, and all technical ideas within the scope of equivalents thereof should be construed as being included within the scope of the present disclosure.

In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A steering control apparatus having a first steering control device comprising:
    a shared resource manager for managing an access right to a shared resource so that an access of the first steering control device to the shared resource shared with one or more second steering control devices is not overlapped with the one or more second steering control devices; and
    a controller for controlling a steering of a vehicle by accessing the shared resource by one of the first steering control device and the one or more second steering control devices according to the access right for the shared resource,
    wherein, when one of the first steering control device and the one or more second steering control devices accesses the shared resources, the controller controls the access of the other of the first steering control device and the one or more second steering control devices to be postponed for a predetermined period of time.

2. The steering control apparatus of claim 1, further comprising:
    a monitor for monitoring a state of the controller;
    a transmitter for transmitting a first monitoring result of the monitor to the one or more second steering control devices; and
    a receiver for receiving a second monitoring result from the one or more second steering control devices.

3. The steering control apparatus of claim 2, wherein, if the shared resource manager provides the access right for the shared resource to the controller, the controller accesses the shared resource to control the steering of the vehicle.

4. The steering control apparatus of claim 3, wherein, if it is determined that the controller is in a failure state according to the first monitoring result of the monitor, the controller blocks the access to the shared resource, and the transmitter provides first failure state information to the other steering control device.

5. The steering control apparatus of claim 2, wherein, if the shared resource manager provides the access right for the shared resource to the other steering control device, the controller blocks the access to the shared resource.

6. The steering control apparatus of claim 5, wherein, if the receiver receives the second failure state information as the second monitoring result from the other steering control device, the controller unblocks the access to the shared resource and controls the steering of the vehicle by accessing the shared resource.

7. The steering control apparatus of claim 1, wherein the shared resource manager manages the access right to the shared resource by using a semaphore.

8. A steering system comprising:
at least two steering controllers sharing a shared resource; and
a communication network connecting the at least two steering controllers to each other,
wherein each of the at least two steering controllers:
manages an access right to the shared resource so that an access of one of the at least two steering controllers to the shared resource does not overlap with the other of the at least two steering controllers, and
controls a steering motor by accessing the shared resource by one of the at least two steering controllers according to the access right for the shared resource,
wherein, when the one of the at least two steering controllers accesses the shared resources, the controller controls the access of the other of the at least two steering controllers to be postponed for a predetermined period of time.

9. The steering system of claim 8, wherein the at least two steering controllers include a first steering controller and a second steering controller, and
wherein the first steering controller monitors the state to generate a first monitoring result, transmits the first monitoring result to the second steering controller through the communication network, and
the second steering controller monitors the state to generate a second monitoring result, and transmits the second monitoring result to the first steering controller through the communication network.

10. The steering system of claim 9, wherein, if the access right to the shared resource is present in the first steering controller, the first steering controller controls the steering motor by accessing the shared resource, and the second steering controller blocks access to the shared resource.

11. The steering system of claim 10, wherein, upon determining that the first steering controller is in a failure state according to the first monitoring result, the first steering controller blocks the access to the shared resource and provides first failure state information to the second steering controller, and
the second steering controller unblocks the access to the shared resource according to the first failure state information and controls the steering of the vehicle by accessing the shared resource.

12. A steering control method comprising:
managing an access right to a shared resource so that an access to the shared resource of each of a first steering controller and a second steering controller does not overlap with each other; and
controlling a steering motor by accessing the shared resource by the first steering controller or second steering controller according to the access right to the shared resource,
wherein, when the one of the first steering controller and the second steering controller accesses the shared resources, the controller controls the access of the other of the first steering controller and the second steering controller to be postponed for a predetermined period of time.

13. The steering control method of claim 12, further comprising:
monitoring a state of each of the first steering controller and the second steering controller after controlling the steering motor by accessing the shared resource,
wherein the monitoring comprises:
monitoring the state of the first steering controller and generating a first monitoring result; and
monitoring the state of the second steering controller and generating a second monitoring result.

14. The steering control method of claim 13, wherein the controlling the steering motor by accessing the shared resource includes, if the access right to the shared resource is in the first steering controller, accessing the shared resource and controlling the steering motor by the first steering controller.

15. The steering control method of claim 14, upon determining that the first steering controller is in a failure state according to the first monitoring result,
the monitoring comprises generating and providing a first failure state information to the second steering controller,
wherein the managing the access right to the shared resource includes blocking the access to the shared resource of the first steering controller and unblocking the access to the shared resource of the second steering controller, and
wherein the controlling the steering motor by accessing the shared resource includes accessing the shared resource and controlling the steering motor by the second steering controller.

* * * * *